United States Patent
Logsdon et al.

(10) Patent No.: US 6,957,113 B1
(45) Date of Patent: *Oct. 18, 2005

(54) SYSTEMS FOR ALLOCATING MULTI-FUNCTION RESOURCES IN A PROCESS SYSTEM AND METHODS OF OPERATING THE SAME

(75) Inventors: George Logsdon, Arlington, TX (US); Gary Elmore, Arlington, TX (US)

(73) Assignee: National Semiconductor Corporation, Santa Clara, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 10/299,949

(22) Filed: Nov. 19, 2002

Related U.S. Application Data

(60) Provisional application No. 60/408,817, filed on Sep. 6, 2002.

(51) Int. Cl.$^7$ .............................................. G06F 19/00
(52) U.S. Cl. .......................... 700/100; 700/29; 700/99; 700/121; 705/8
(58) Field of Search .............................. 700/29–31, 99, 700/100, 103, 104, 121; 705/8, 9, 11; 703/2

(56) References Cited

U.S. PATENT DOCUMENTS

| | | | | |
|---|---|---|---|---|
| 4,924,386 A | * | 5/1990 | Freedman et al. .............. | 705/8 |
| 5,044,314 A | * | 9/1991 | McNeilly .................... | 118/715 |
| 5,544,350 A | * | 8/1996 | Hung et al. .................... | 716/19 |
| 5,649,113 A | * | 7/1997 | Zhu et al. ....................... | 705/7 |
| 5,745,652 A | * | 4/1998 | Bigus ........................... | 706/14 |
| 5,946,212 A | * | 8/1999 | Bermon et al. ................ | 700/97 |
| 6,230,068 B1 | * | 5/2001 | Wu et al. ..................... | 700/121 |
| 6,546,364 B1 | * | 4/2003 | Smirnov et al. ............... | 703/22 |
| 6,591,153 B2 | * | 7/2003 | Crampton et al. ........... | 700/103 |
| 6,615,092 B2 | * | 9/2003 | Bickley et al. ............... | 700/99 |
| 6,625,577 B1 | * | 9/2003 | Jameson ........................ | 705/8 |
| 6,763,277 B1 | * | 7/2004 | Allen et al. .................. | 700/100 |

* cited by examiner

*Primary Examiner*—Paul Rodriguez

(57) ABSTRACT

There are disclosed systems, as well as methods of operation, for allocating multi-function resources among a plurality of tasks within a process system. An exemplary resource allocator is introduced that allocates multi-function resources among tasks within a process system capable of executing at least one application process. The resource allocator comprises a monitoring controller, model of the process system and a resource allocation controller. The monitoring controller monitors measurable characteristics associated with the executing application process, multi-function resources and tasks, each of the measurable characteristics being one of a status characteristic and a logistical characteristic. The model represents mathematically the multi-function resources and the tasks, and defines relationships among related ones thereof as a function of the application process. The resource allocation controller operates the model in response to the monitored measurable characteristics and allocates ones of the multi-function resources among ones of the tasks within the process system to efficiently execute the at least one application process.

31 Claims, 6 Drawing Sheets

SYSTEMS FOR ALLOCATING MULTI-FUNCTION RESOURCES IN A PROCESS SYSTEM AND METHODS OF OPERATING THE SAME

This application claims priority to U.S. Provisional Patent Application Ser. No. 60/408,817 filed Sep. 6, 2002. This application is commonly owned by the assignee of this patent document. This application is incorporated by reference for all purposes as if fully set forth herein.

TECHNICAL FIELD OF THE INVENTION

The present invention is directed generally to resource allocation systems and process control systems and, more specifically, to systems and methods for allocating a plurality of multi-function resources among a plurality of tasks within a process system.

BACKGROUND OF THE INVENTION

Allocation of multi-function resources within resource allocation and process control systems may be thought of as the management (i.e., administration, command, control, direction, governance, monitoring, regulation, etc.) of such multi-function resources (e.g., manufacturing tools, instruments, hardware, software, databases, communication/connectivity resources, transportation resources, facilities, utilities, inventories, etc.) among a variety of tasks within a process system.

Process systems may be arranged and implemented to manage large facilities, such as a manufacturing plant, a semiconductor fabrication facility, a mineral or crude oil refinery, or the like, as well as relatively smaller facilities, such as a corporate communications network, a data repository and management system, or the like. Such systems may be distributed or not, and typically include numerous modules tailored to manage various associated processes, wherein conventional means link these modules together to produce the distributed nature of the process system. This affords increased performance and a capability to expand or reduce the process system to satisfy changing needs.

Process systems are developed and tailored to satisfy wide ranges of process requirements, whether local, global or otherwise, and regardless of facility type. Such developers and users of such systems commonly have two principle objectives: to (i) centralize management/control of as many sub-processes or processes as possible to improve overall efficiency and (ii) support a common interface that communicates data among various modules managing/controlling or monitoring the processes, and also with any such centralized controller.

Each process, or group of associated sub-processes or processes, has certain input (e.g., data, diagnostics, feed, flow, power, etc.) and output (e.g., data, pressure, temperature, utilization parameters, etc.) characteristics associated therewith. These characteristics are measurable, and may be represented in a discernable manner.

Predictive control methodologies/techniques may be used to optimize certain processes as a function of such characteristics. Predictive control techniques may use algorithmic representations to estimate characteristic values (represented as parameters, variables, etc.) associated with them that can be used to better manage such process resources among a plurality of tasks.

Such optimization efforts only account mathematically for the tasks being performed and the process resources then used to resolve the same based upon statistical characteristics only, thereby failing to model and factor into the optimization effort both status and logistical data, as well as to account for human capabilities and interaction (i.e., functions, skills, qualifications, task preferences, track records and the Like) that ultimately utilize the process resources to resolve the tasks. Conventional approaches can exhibit poor response to constantly changing or exigent circumstances, and as such fail to cooperatively optimize process resources, particularly process resources capable of performing multiple functions. What is needed in the art is a powerful and flexible means for dynamically analyzing and modifying process status in a real-time mode through allocation and reallocation of multifunction process resources among a plurality of tasks within a process system.

Using semiconductor fabrication as an example, in order to provide shortest cycle times, highest quality, timely-delivered cost-effective products that meet revenue growth plans, there is a continuous need to improve manufacturing processes and sub-processes, including the content and methods of delivering information to the operations staff.

Information about manufacturing tools and work in process inventory are critical to the decision making process necessary to operate a semiconductor wafer manufacturing line. With complex multi-tool, multi-technology, multi-product resources ("multi-function resources"), a need exists in the industry for a system and method that allocate such multi-function resources among a plurality of tasks within fabrication facility so as to execute a flexible process or plan that responds to work-in-process ("WIP") mix, resource availability changes, associate work schedule and skill sets (e.g., "queue-jumping" hot lots, special work requests, etc.) to meet the requirements of a "just-in-time" environment.

Stated more broadly, a measurement of process efficiency can be defined by how quickly demands by requesting tasks are satisfied through the allocation of process resources. Today, even though human operators assist in the allocation of resources to requesting tasks, decisions to allocate such resources are controlled by management (whether human management based upon periodic reports (e.g., daily, weekly, monthly or, even, quarterly), or automated management based upon periodic batched data, or some combination of the two) which reacts or decides based upon stale data, rather than reacting/deciding dynamically.

Therefore, a further need exists for a process system and related graphical user interface through which management reacts timely relative to conventional systems based upon dynamic data.

SUMMARY OF THE INVENTION

To address the above-discussed deficiencies of the prior art, it is a primary object of the present invention to provide systems, as well as methods of operating the same, for allocating multi-function resources among a plurality of tasks within a process system.

Broadly, such systems and methodologies enable real-time process automation through mathematical modeling of multi-function process resources (e.g., manufacturing tools, hardware, software, databases, communication/connectivity resources, transportation resources, facilities, utilities, inventories, etc.), and then allocating ones of such resources to perform various tasks within the process system, commonly in accord with at least one application process. It should be noted that such systems and methodologies may be suitably arranged to maintain a knowledge database and to modify the same to record past experiences thereby enabling the same to be self-learning.

In accord with the principles of the present invention, an exemplary resource allocator is introduced that allocates such multi-function resources among a plurality of tasks within the process system executing the at least one application process. This resource allocator comprises a monitoring controller, a model of the process system and a resource allocation controller.

An exemplary monitoring controller monitors measurable characteristics associated with the executing application process, multi-function resources and related tasks, each of the measurable characteristics being one of a status characteristic and a logistical characteristic. An exemplary model represents mathematically the multi-function resources and the tasks, and defines relationships among related ones thereof as a function of the application process (e.g., one or more application processes, resources, tasks, etc.). An exemplary resource allocation controller operates the model in response to the monitored measurable characteristics and allocates ones of the multi-function resources among ones of the tasks within the process system to efficiently execute the at least one application process.

In a related embodiment, a suitably arranged graphical user interface ("GUI") is associated with the process system. The GUI is operable to transform real-time process system information into multimedia format to enable supervisor (i.e., human management, system management (self-learning or otherwise), or some suitable combination of human and system management) interaction.

An advantageous embodiment for the present invention is a resource allocator for use in a diffusion process. For instance, a diffusion process in semiconductor wafer fabrication may be described as a process of depositing a dopant material onto a silicone substrate and diffusing the dopant material into the silicone substrate via thermal agitation (the diffusion process is preferably capable of executing a plurality of diffusion process plans).

An exemplary resource allocator operates to allocate a plurality of multi-function resources, or tools (e.g., furnaces (high temperature atmospheric pressure, low pressure chemical vapor deposition, doping (bbr3, pocl3, etc.), anneal, alloy, curing, etc.)); wet chemical process stations (self contained, open bath, etc.); work in process controllers (stockers, transport modules, etc.); people (equipment loaders, operators, repair technicians, etc.), among a plurality of tasks of any given diffusion process plan. The resource allocator comprises a monitoring controller, a model and resource allocation controller.

The monitoring controller monitors measurable characteristics associated with an executing diffusion process plan, the multi-function resources, and the related tasks. Each of the measurable characteristics is one of a status characteristic (e.g., execution data, timing data, alert data, completion data, recipe name, sub-recipe name, idle or running, etc.) or a logistical characteristic (e.g., assignment data, availability data, capacity data, diffusion process plan data, prioritization data, process duration, queue time, alternative resource options, competing resource options, skill sets, etc.).

The model is of the diffusion process, and represents mathematically the plurality of multi-function resources and the plurality of tasks, as well as defines relationships among related ones thereof as a function of the diffusion process plans.

The resource allocation controller operates the diffusion process model in response to the monitored measurable characteristics and allocates certain of the multi-function resources among certain of the tasks to efficiently execute the diffusion process plan. The resource allocation controller is therefore operable to select and reselect allocated ones of the multi-function resources.

During the diffusion process, meaning before, during and between execution of various diffusion process plans, the resource allocation controller operates to modify ones of the mathematical representations in response to the status or logistical characteristic data. In a related embodiment, the resource allocator comprises a data repository having at least a knowledge database, and the resource allocator further operates to modify the knowledge database in response to changes to or the condition/value of the status and logistical characteristic data to thereby enable the resource allocator to be self-learning.

Before undertaking a DETAILED DESCRIPTION OF THE INVENTION, it may be advantageous to set forth a definition of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, coupled to or with, be communicable with, cooperate with, interleave, juxtapose, be proximate to, be bound to or with, have, have a property of, or the like; the term "memory" means any storage device, combination of storage devices, or part thereof whether centralized or distributed, whether locally or remotely; and the terms "controller," "processor" and "allocator" mean any device, system or part thereof that controls at least one operation, such a device, system or part thereof may be implemented in hardware, firmware or software, or some combination of at least two of the same.

It should be noted that the functionality associated with any particular controller or allocator may be centralized or distributed, whether locally or remotely. In particular, a controller or allocator may comprise one or more data processors, and associated input/output devices and memory that execute one or more application programs and/or an operating system program.

Additional definitions for certain words and phrases are provided throughout this patent document, those of ordinary skill in the art should understand that in many, if not most instances, such definitions apply to prior, as well as future uses of such defined words and phrases.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is made to the following descriptions taken in conjunction with the accompanying drawings, wherein like numbers designate like objects, and in which.

DETAILED DESCRIPTION OF THE INVENTION

FIGS. 1 through 6, discussed below, and the various embodiments used to describe the principles of the present invention in this patent document, are by way of illustration only and should not be construed in any way to limit the scope of the invention. Those skilled in the art will understand that the principles of the present invention may be implemented in any suitably arranged system, as well as method of operating the same, for allocating a plurality of resources, both process and human resources, among a plurality of tasks within a process system.

Figure 1:
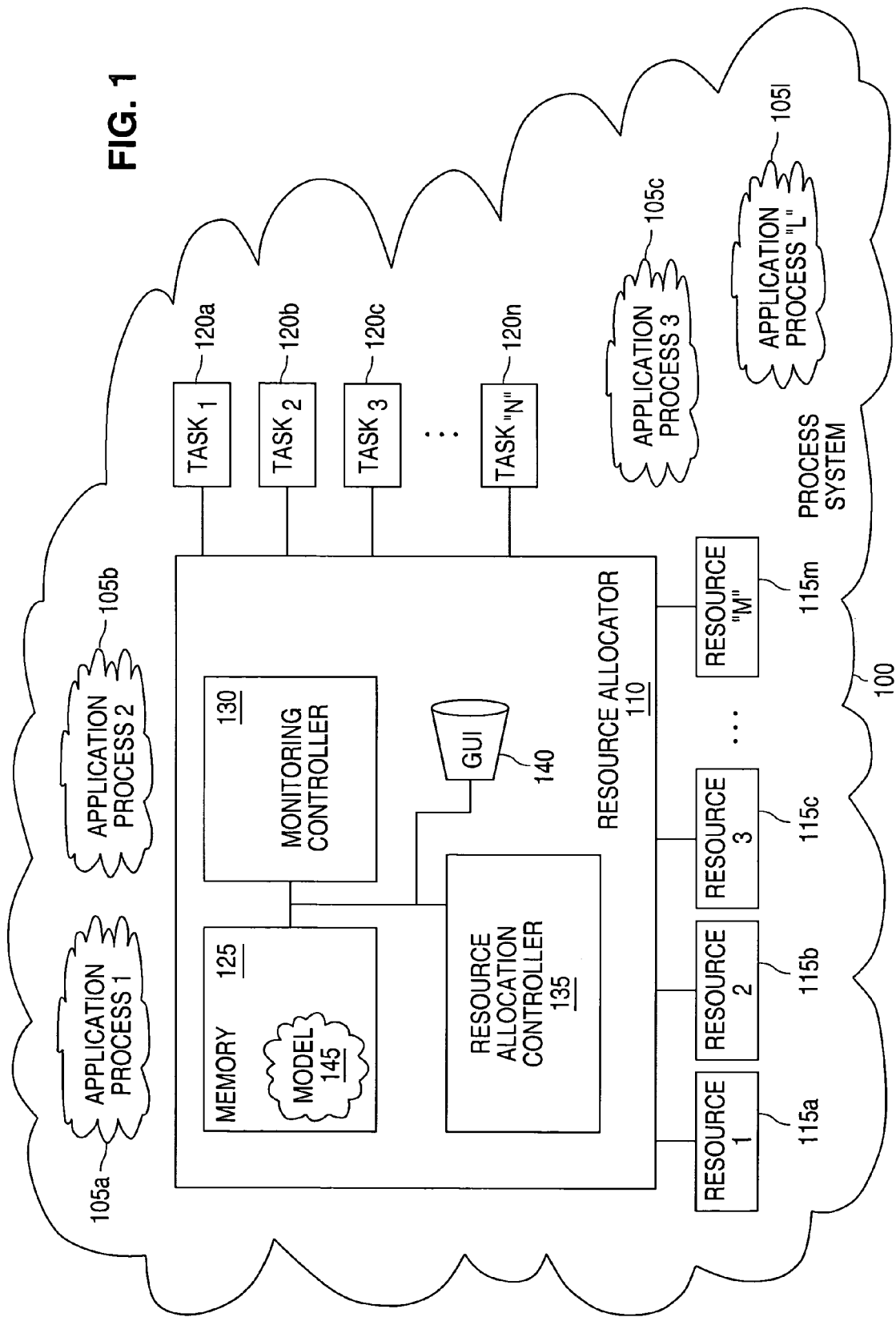
FIG. 1 illustrates an exemplary process system and associated resource allocator in accordance with the principles of the present invention.

Turning initially to FIG. 1, illustrated is an exemplary process system (generally designated 100, that includes a plurality of application processes 105; for purposes hereof, "application process" is defined broadly as a program or a part of a program that can execute, whether independently of other parts or not, and is designed for or to meet the needs of the process system 100—an application process may suitably consist of low-, mid- or high- level programs or parts thereof that interact with process system 100) that is associated with a resource allocator (generally designated 110), all in accordance with the principles of the present invention. For purposes hereof, the phrase "process system" means any computer processing system, network of computer processing systems, or portion thereof that is operable to monitor, control or otherwise supervise a process (e.g., information management system, manufacturing plant (e.g., semiconductor fabrication), refinery, hotel, restaurant, traffic control, transportation control, emergency services (e.g., police, fire, medical, military, etc.), and the like).

According to one advantageous embodiment hereof, process system 100 is a semiconductor fabrication facility that is operable to handle multiple and varied application processes, or plans, associated with complex multi-function resources (e.g., tools (including varying technologies)) and tasks to manufacture multiple and widely varying semiconductor products. System 100 may, in whole or in part, be a network-based, real-time, visualized, intelligent (i.e., self-learning) system, and include control enhancements for industries, whether manufacturing or otherwise, that require timely delivery of services, products or other resources.

Exemplary resource allocator 110 is operable to allocate a plurality of multi-function resources 115 among a plurality of tasks 120 within process system 100, wherein, for purposes of illustration, exemplary multi-function resources 115 may suitably be any tool, device or other system used in the manufacture process of semiconductor products. According to one advantageous embodiment hereof, resource allocator 110 is a general processor that is operable to accept variable service requests and to intelligently apply the required resource(s) to address such requests. Resource allocator 110 illustratively includes a memory 125, a monitoring controller 130, a resource allocation controller 135 and is associated with a graphical user interface ("GUI," which provides graphical information controls, as discussed with reference to FIGS. 2A and 2B) 140, which cooperatively offer enhancements of real-time, visual, intelligent, and control functions, possibly through web-base connectivity.

Exemplary memory 125 is operable to store a model 145 of process system 100. Exemplary model 145 represents mathematically application processes 105, multi-function resources 115, and tasks 120, and also defines various relationships among related ones of application processes 105, multi-function resources 115, and tasks 120. According to one advantageous embodiment hereof, memory 125 includes a plurality of databases (shown in FIG. 3) used, for instance, for service/function, control and knowledge.

A service/function database may be operable to store information regarding customers, networks, transactions, resources, communications or the like. A control database may be operable to store algorithms, rules, key elements for decision-making or the like. A knowledge database may be operable to provide task related intelligent information to help make optimal decisions, and to acquire and accumulate experience through evaluating results (i.e., artificial intelligence, expert system analysis, neural networks, etc.).

Exemplary monitoring controller 130 is operable to monitor measurable characteristics associated with ones of application processes 105, multi-function resources 115, and tasks 120. According to one advantageous embodiment hereof, monitoring controller 130 is a real-time monitor of updated status or logistical data of resources and tasks, and enables human interaction online with other subsystems, allowing a human interface to respond to, modify, update or over-ride the automated decision-making processes. Each of the measurable charactertistics is one of a status characteristic or a logistical characteristic.

Exemplary resource allocation controller 135 is responsive to ones of the monitored measurable characteristics and may be operable to: (i) operate the model; (ii) modify ones of the mathematical representations of application processes 105, multi-function resources 115, tasks 120, and the defined relationships among related ones of application processes 105, multi-function resources 115, and tasks 120; and (iii) allocate ones of resources 115 among ones of tasks 120 within process system 100.

According to one advantageous embodiment hereof, broadly, resource allocation controller 135 allocates ones of multi-function resources 115 among ones of tasks 120 within process system 100 in response to the monitored measurable characteristics to efficiently execute one or more application processes 105, and, more specifically, operates to interact with available resources and tasks to generate and manage the required transactions within one or more application processes 105 (noting, for instance, that measurable characteristics of resource allocation controller 135 may be associated with management of customers, networks, resources, and communications, such as service objectives, metrics, and measurements).

Exemplary GUI 140 is a user interface that is operable to transform real-time process system information into an audio or visual format to enable supervisory interaction. According to one advantageous embodiment hereof, GUI 140 is operable to visualize the data and status of external resources, service requests as well as on-going transactions by using graphic displays, multimedia equipment to provide real-time data as well as historical and statistical information with human interaction.

Figure 2A:
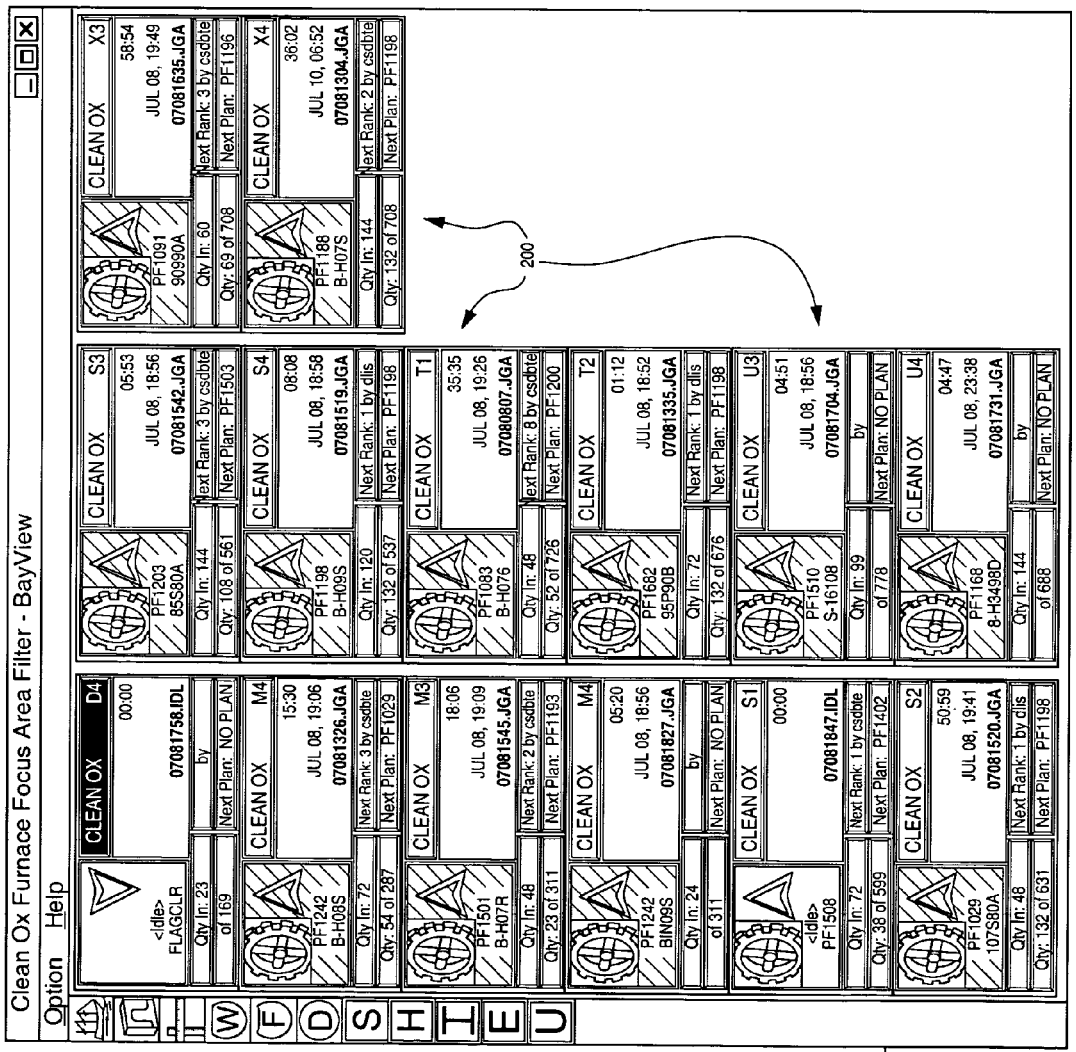
FIG. 2A illustrates a graphical user interface ("GUI") in accord with the principles of the present invention for use in a semiconductor wafer fabrication.

Turning to FIG. 2A illustrated is an exemplary GUI 140 in accord with the principles of the present invention for use in a semiconductor wafer fabrication. GUI 140 includes a plurality of icons 200 representing a plurality of multi-function resources 115. In wafer fabrication, the mission is to provide the shortest cycle time, highest quality, cost effective products on time to continually meet revenue growth plans. This causes an on-going need to continuously improve manufacturing processes including the content and methods of delivering information to an operations staff.

Status information about the manufacturing tools and work in process inventory are often critical to making decisions needed to successfully operate a wafer manufacturing line on a daily basis. In executing an application process, or plan, it is critical to know what is planned next—a time-consuming communication exercise. These plans may be flexible in responding to WIP mix, tool availability changes, associated work schedules and skill sets—a "just in time" environment is responsive to "queue jumping hot lots", or "Static WIP" as well as special work requests for certain portions of lots that make the planning process more difficult. Being able to project output by the "end of business" makes for its own special status requirements when attempting to measure turns and operational outputs.

Real-time information is preferred to updated batch reporting, and when combined with GUI 140 interface, operational staff productivity increases significantly. In one implementation, resource, or tool-level, status data is updated automatically every minute while the logistical information is update every other minute. The exemplary running wheel icon is easily contrasted between "on" and "off" (or static) used to display an "idle" furnace making for quick interpretation.

According to this implementation, status data changes as the tool itself progresses through process sub-steps, and is sensed from the sensors, timers, controllers (e.g., mass flow controllers, thermocouples, countdown buffers, etc.), etc. Status data may suitably be modified by one resource or tool at a time and changes in logistical data do not directly cause a change in status data. Logistical data is typically digital in nature and arguably comprehends conditions not residing on the resource or tool itself (e.g. number of lots, operator identification, plan state, etc.). The logistical data of a group of resources or tools may change based on a status change of any one resource or tool, a task, an application process, a lot of material, or the like.

Many resources, such as furnaces, for example, can be sub-divided into smaller logical workgroups arrangements or into process focus area groups (e.g., clean oxidation). An exemplary display for each tube's information is a combination of tool and logistical level data in a standardized format that includes:

tool name, tool focus Area assignment, idle or running, up or down, ownership (e.g., Prod, Eng, Mnt), process running including the sub-routine level, time remaining, time of completion, # wafers in process, # wafers available to process, # wafers in next application process (or plan), next process planned, originator of next application process, rank of next application process in relation to dispatching system.

Figure 2B:
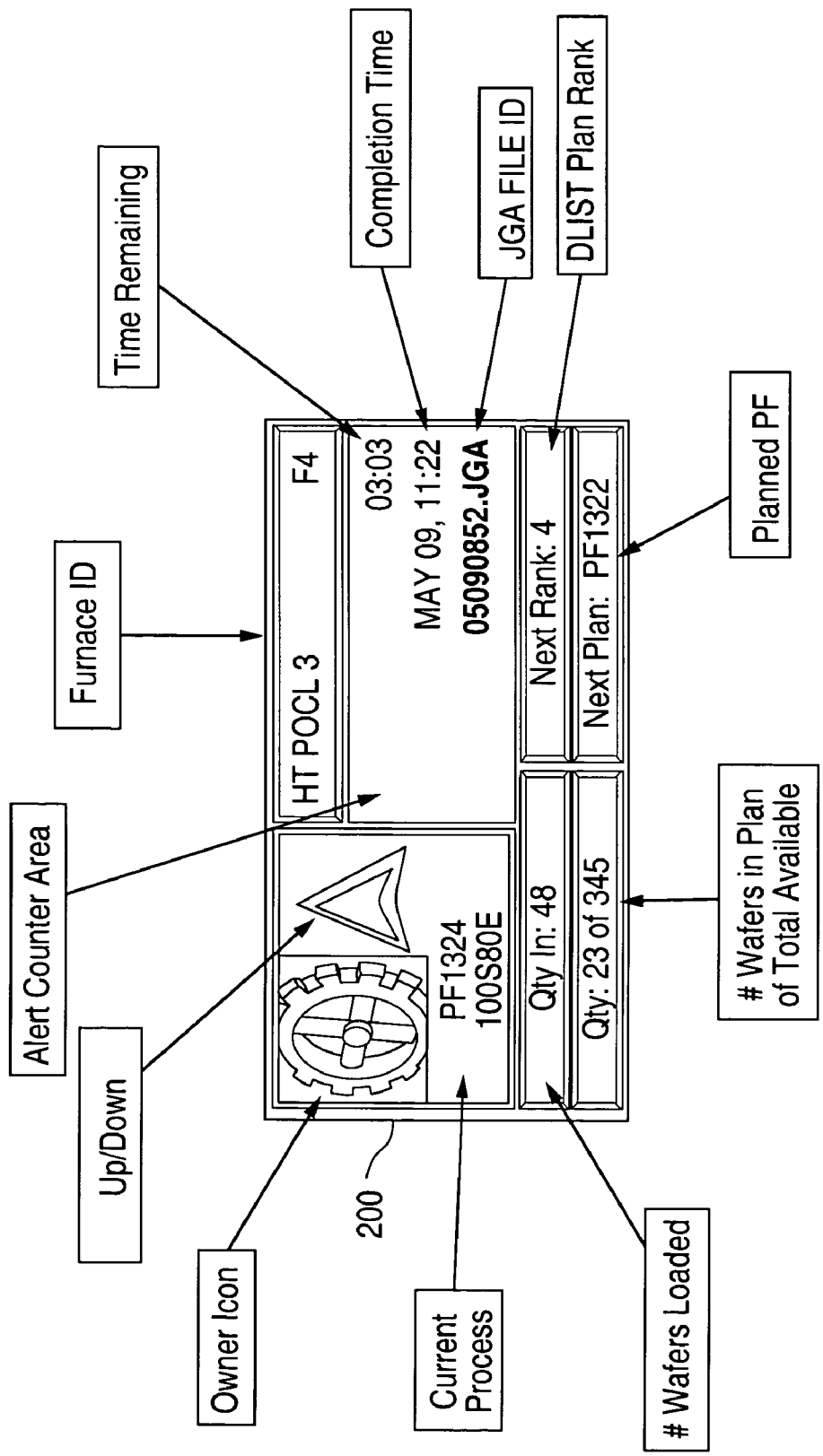
FIG. 2B illustrates an icon from the GUI of FIG. 2A that represents one of a plurality of multi-function resources in accord with the principles of the present invention for use in a semiconductor wafer fabrication.

Turning to FIG. 2B, illustrated is an exemplary icon that represents one of a plurality of multi-function resources 115 in accord with the principles of the present invention for use in a semiconductor wafer fabrication. Additional features include special symbols that appear if the tool develops an equipment error condition, as this may cause a need for a modification of a loading plan, as an example. Buttons enable queries of the factory logistical data including qualification schedules, last "X" hour history, whole area WIP (e.g., running, ready to load, ready to pre-clean, etc.), application processes for other tools including the unload schedules for work currently in process. Button bars may also include launch points for viewing either the current run data itself or in combination with historical runs of this or any other furnace, according to this example.

Figure 3:
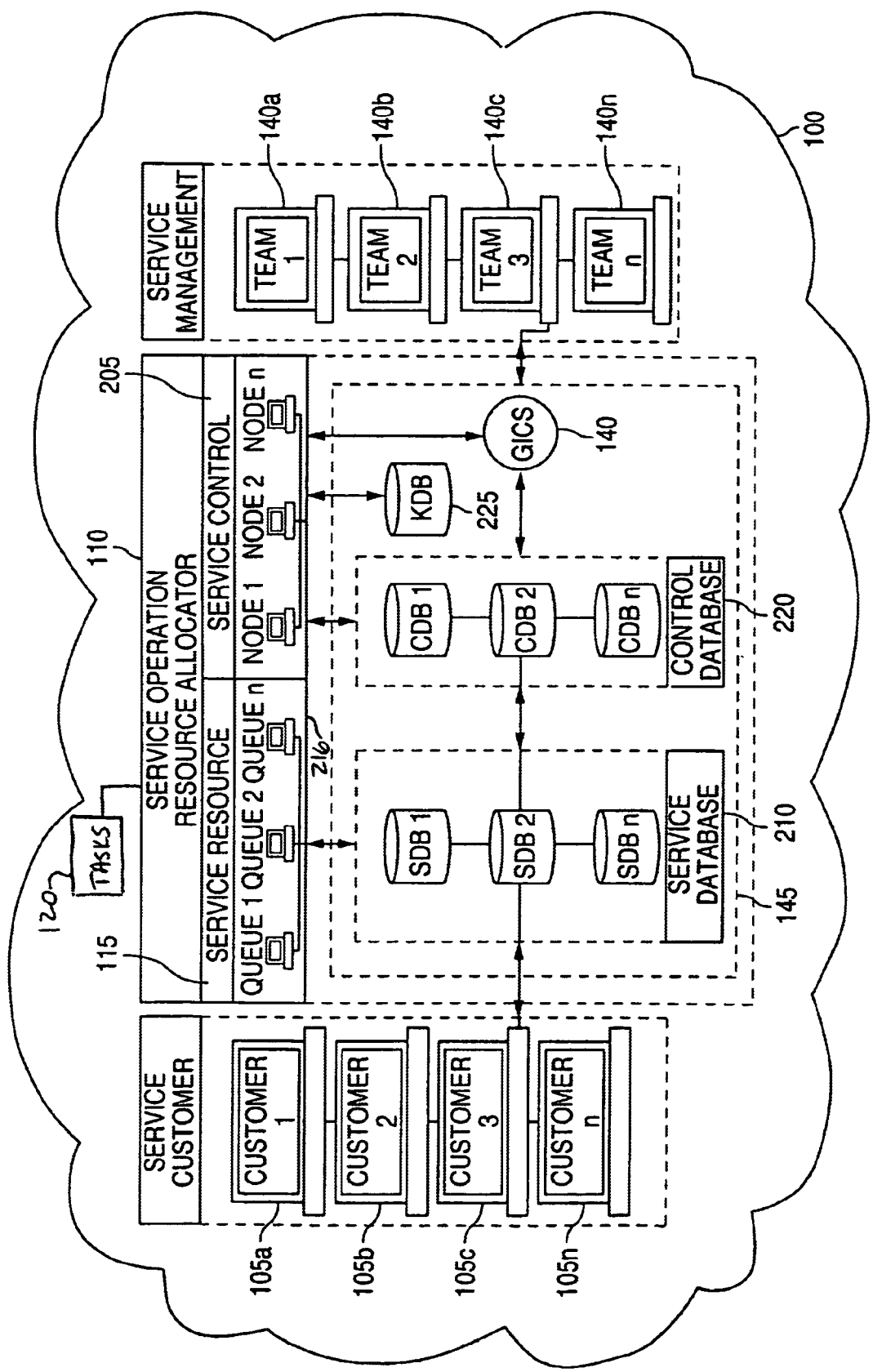
FIG. 3 illustrates a block diagram of a process system implemented as an information management system associated with the resource allocator of FIG. 1, all in accordance with the principles of the present invention.
Figure 4:
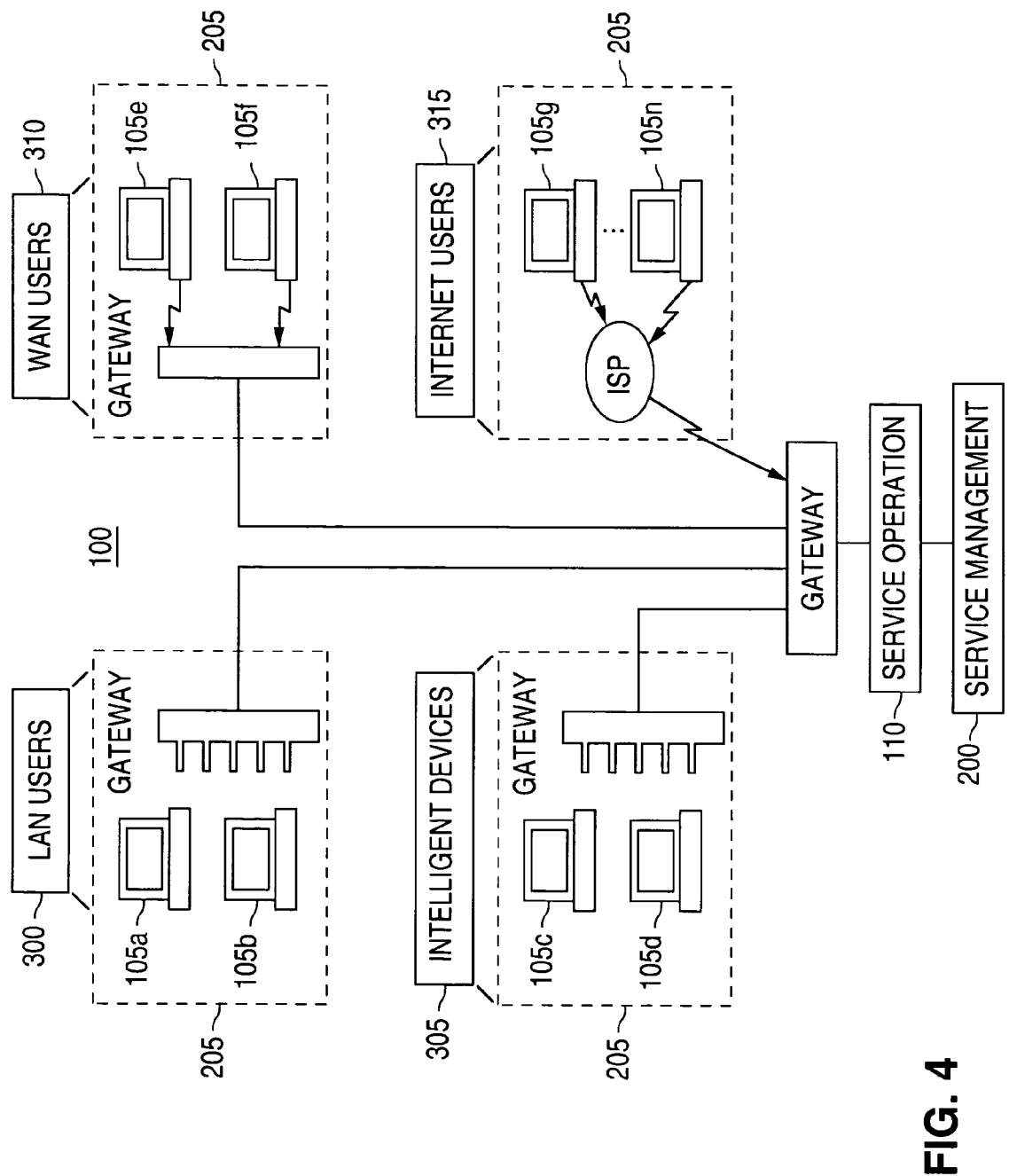
FIG. 4 illustrates a block diagram of a network infrastructure utilized to implement a distributed embodiment of the process system of FIGS. 1 and 3 in association with a centralized implementation of resource allocator, all in accordance with the principles of the present invention.

Turning next to FIGS. 3 and 4, introduced is an information management system embodiment of process system 100 of FIG. 1. Exemplary process system 100 is introduced by way of illustration only to describe the principles of the present invention and should not be construed in any way to limit the scope of the invention. Illustrated is a conceptual block diagram of process system 100 associated with a service operation resource allocator 110, all in accordance with the principles of the present invention. Exemplary process system 100, in addition to service operation resource allocator 110, also includes a plurality of application processes 105, namely, a service customer block, and a service management block.

Exemplary service customer block may be a person or a controller; for instance, service customer block may suitably be a person using a computer that is associated with an intranet or the Internet, or it may be an intelligent input/output device associated with equipment to send and receive data using connectivity.

Exemplary service management block includes a plurality of GUIs 140 that provide user interfaces operable to transform real-time information into an audio or visual format to enable supervisory interaction. Service management block is operable to enable supervisory interaction with flexibility to visualize and control the entire service process flexibly (in a related embodiment, such supervisory interaction may suitably be in detail or in general with zoom in/out functions in a real-time mode).

Exemplary service operation block 110 is a resource allocator that is operable to allocate a plurality of service resources 115 among a plurality of tasks 120 within process system 100. Service resources 115 include multifunction resources, which may include definitions of human resources based upon services, functions, activities, skills, qualifications, task preferences, track records and the like. Exemplary human resources may include service staff that work with customers or service requests, such as waiters, mechanics, plumbers, painters, electricians, soldiers, technicians, engineers, etc. Exemplary human resources may also include service coordinators, system operators and administrators that support the operations, such as accountants, purchase agents, auditors, receptionists, secretaries, controllers, servicemen, network administrators, etc. Exemplary human resources may also include service managers, system managers, and operation managers that manage the process system and make business and operations decisions, such as it managers, police chiefs, hotel managers, restaurant managers, store managers, officers, executives, etc.

The process resources may suitably be classified into eight categories, namely, tools, hardware, software, databases, communication/connectivity resources, transportation resources, facilities, utilities, and inventories. Exemplary hardware resources include computers, network devices such as switches/routers/hubs, digital/analog sensors, cables, meters, monitors, scopes, audio/video devices, special service tools, etc. Exemplary software resources include operation systems, network systems, database systems, application programs, graphics interfaces, system utilities, special applications such as artificial intelligence, neural net, system control and data acquisition, etc.

Exemplary data resources include three databases, namely, (i) service databases 210 that maintains service objects (customers/equipment), service transactions, networks, resources, and communications, (ii) control databases 220 that maintains key attributes, algorithms, instructions, mathematics and rules that manage, monitor and control the operations, and (iii) knowledge databases 225 that maintain on-going real-time knowledge, information and experiences compiling for resource retention and self-learning process.

Exemplary communication/connectivity resources include local-area and wide-area networks, Internet, telephones/facsimile, mail, etc. Exemplary transportation resources include trucks, cars, boats, airplanes, bikes, motorcycles, railroads, space shuttles, balloons, military vehicles, all-terrain vehicles, satellites, etc. Exemplary technology resources include service automation technology that combines major technology areas, namely, (i) network technologies in office automation, (ii) human machine interface ("HMI") technologies in industrial automation, and (iii) artificial intelligent technologies. Exemplary facilities resources include computer control/monitor/server rooms, labs, workrooms, offices, towers/antenna, machines/tools, piping, etc. Exemplary utilities resources include electricity, water, fuel, air, chemicals, automated warehousing, distribution systems/gathering systems, etc. Exemplary inventory resources include supplies, materials, peripherals, components, ammunition, etc.

An important aspect of the illustrated embodiment is that service operation block 110 provides systematic operation with automatic and responsive control of service activities based on real-time service data and built-in intelligent decisions from model 145 of FIG. 1. Routine decisions are made by service automation while service operations are on going. The management is able, via GUIs 140, to make responsive decisions and allocate or utilize service intelligently based on the real-time graphics-enhanced information.

Service operation block 110 is illustratively associated with a plurality of service resources 115 and a plurality of service controls 205. Exemplary service resources 115 may suitably include tools, hardware, software, information or facilities, all of which are to be applied to service activities. Exemplary service controls 205 may suitably include monitoring controller 130, resource allocation controller 135, and model 145, all of FIG. 1, that work cooperatively to automatically issue service instructions according to defined rules of model 145.

Service control 205 therefore monitors and controls the service resource allocation and utilization as well as service level and matrix for the service operation. Model 145 of service control 205 again represents mathematically service customer 105, service resources 115, and tasks 120, and also defines various relationships among related ones of the same, and includes a service database 210, a control database 220 and knowledge database 225. Any suitably arranged mathematical representation may be used for model 145 or, for that matter, any of the measurable characteristics. Those skilled in the art will readily recognize that such mathematical representations will often be application dependent. Such measurable characteristics may be either status characteristics and logistical characteristics, and are used to execute model 145 to efficiently allocate resources.

Exemplary service database 210 is operable to store real-time information regarding service customers 105 and service activities. Service database 210 provides information of service activities to service resources 115 through a plurality of service queues 216. Service database 210 also feeds real-time information to control database 220. According to the present embodiment, service database 210 may suitably be a relational database with flat file structure containing data in a two-dimensional table format. Exemplary control database 220 is operable to store consolidated real-time key attributes of information from service database 210 and also stores pre-defined algorithms (instructions and rules associated with monitoring controller 130 and resource allocation controller 135). Instructions can be automatically executed according to the rules and real-time key attributes. Service control 205 works with control database 220 to carry out defined instructions. According to the present embodiment, control database 220 is a data file with special format that contains key data and algorithms (instructions and rules associated with monitoring controller 130 and resource allocation controller 135).

Exemplary knowledge database 225 is operable as a central repository of qualitative and quantitative information to develop standards of performance in activities that are common regardless of industry. Knowledge data that would serve as a reference point for performance and procedural improvement to provide task related intelligent information used to make decisions optimally, and to acquire and accumulate experience through evaluating results (i.e., artificial intelligence, expert system analysis, neural networks, etc.).

An important aspect of the illustrated embodiment is that control database 220 serves to provide information service management with multimedia, and control enhancements based on real-time information. In summary, using service database 210, control data base 220 and knowledge database 225, resource allocator 110 is operable to allocate a plurality of multifunction service resources 115 among a plurality of tasks within process system 100.

Turning now to FIG. 4, illustrated is a conceptual block diagram of an exemplary network infrastructure utilized to implement a distributed embodiment of process system 100 in association with a centralized implementation of service operation resource allocator 110. Exemplary distributed process system 100 includes a plurality of application processes 105, including LAN users 300, intelligent devices 305 (e.g., personal data assistants ("PDAs"), two-way messaging devices, etc.), WAN users 310, Internet users 315, and the like. Those of ordinary skill in the art will recognize that this embodiment and other functionally equivalent embodiments may suitably be implemented by a variety of methods using many different computer, or processing, system platforms. Conventional computer and processing system architecture is more fully discussed in *Computer Organization and Architecture*, by William Stallings, MacMillan Publishing Co. (3$^{rd}$ d. 1993); conventional processing system network design is more fully discussed in *Data Network Design*, by Darren L. Spohn, McGraw-Hill, Inc. (1993); and conventional data communications is more fully discussed in *Data Communications Principles*, by R. D. Gitlin, J. F. Hayes and S. B. Weinstein, Plenum Press (1992) and in *The Irwin Handbook of Telecommunications*, by James Harry Green, Irwin Professional Publishing (2$^{nd}$ ed. 1992). Each of the foregoing publications is incorporated herein by reference for all purposes.

Broadly, process system 100 allocates a plurality of multifunction resources among a plurality of tasks thereby enabling real-time process automation through mathematical modeling of the process resources 115 and tasks 120, and then allocating ones of such resources 115 to perform various tasks 120 within the process system 100. For the purposes of the illustrated embodiment of FIG. 4, tasks are divided into three categories, namely, service requests, service dispatches and information sharing. A service request may suitably be stored in service databases 210 with priority, location, contents, requirements, contacts, etc. A service dispatch may suitably be stored in control databases 220 and knowledge databases 225 with service level objectives, service metrics/measurements, transaction/actions, status and situations, decision-making processes with real-time responsive, pre-defined, programmed, intelligent, knowledge/experience retention and self-learning characters. Information sharing is a request for computer generated audio/video and print report, e-based, real-time, graphical/visualized, etc.

Figure 5:
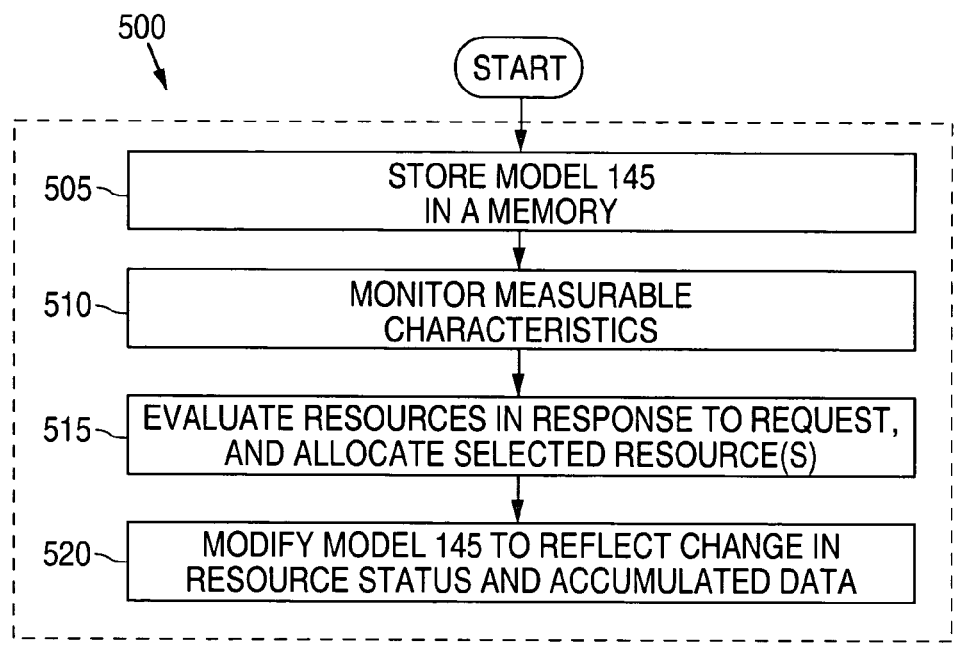
FIG. 5 illustrates a flow diagram of an exemplary method of operating the process system of FIGS. 1 to 4 in accordance with the principles of the present invention.

Turning next to FIG. 5, illustrated is a flow diagram (generally designated 500) of an exemplary method of operating process system 100 of FIGS. 1 to 4, all in accord with the principles of the present invention. For purposes of illustration, concurrent reference is made to embodiment disclosed with reference to FIG. 1. It is beneficial to assume that process system 100 is instantiated and fully operational, and for illustrative purposes directed to a raw material refining environment. Further, for simplicity, assume that there are a plethora of multifunction resources, including human resources. Thus, exemplary process system 100 controls processing raw materials, and likely controls a control center and associated process stages (not shown; e.g., application processes 105).

A first multi-function resource 115 might include raw material grinders that receive a feed of raw material and grind the same, such as by using a pulverizer or a grinding wheel, into smaller particles of raw material. A second process stage multi-function resource 115 might include a washer that receives the ground raw materials and cleans the same to remove residue from the first stage. A third multi-function resource 115 might include separators that receive the ground, washed raw materials and separate the same into desired minerals and any remaining raw materials. Since this process system and related facility are provided for purposes of illustration only and the principles of such a facility are well known, further discussion of the same is beyond the scope of this patent document and unnecessary.

To begin, resource allocator 110 stores a model 145 of process system 100 in memory (process step 505), model 145 representing mathematically multifunction resources 115, the process resources, the application processes 105 (i.e., the control for the grinders, separators and washers, etc.), and relationships among related ones thereof. Resource allocator 110 then monitors these measurable characteristics and receives service requests (process step 510), and, for the present example, from a particular grinder. The measurable characteristics may be status or logistical.

In response to measurable characteristics causing a request for service of the subject grinder, resource allocator 110 evaluates the alternate resources available and allocates one to provide the same function, along with process resources that may be necessary and appropriate to complete the same (process step 515). Resource allocator 110, in response to the servicing of the task, modifies ones of the mathematical representations, first indicating that the resource is occupied and possibly indicating the quality with which the task was completed (process step 520).

According to the illustrated embodiment, resource allocator 110 modifies knowledge database 225 to provide updated task related information to help make future decisions concerning the grinder, the allocated alternative grinder, and possibly any human resource used to service the same, etc., both intelligently and optimally. Resource allocator 110 thereby acquires and accumulates experience through evaluating results (i.e., artificial intelligence, expert system analysis, neural network analysis, etc.). Thus, in a later scenario, should this same multifunction resource 115 be otherwise occupied with another task and this grinder requires a similar service, resource allocator 110 can suitably utilize dynamic knowledge database 225 evaluate available resources 115 to decide whether to reallocate this same grinder resource 115 to the based upon past experience recorded in the associated measurable characteristics or to allocate another resource to the task left uncompleted. Again, multifunction resources, both process and human, are re-usable, re-directable for "next" requests through intelligent decision making sub-process of experience accumulation, analysis, optimization and self-learning. Knowledge database 225 operates as a central repository of knowledge data, capturing qualitative and quantitative information to develop standards of performance in activities that are common regardless of industry.

Figure 6:
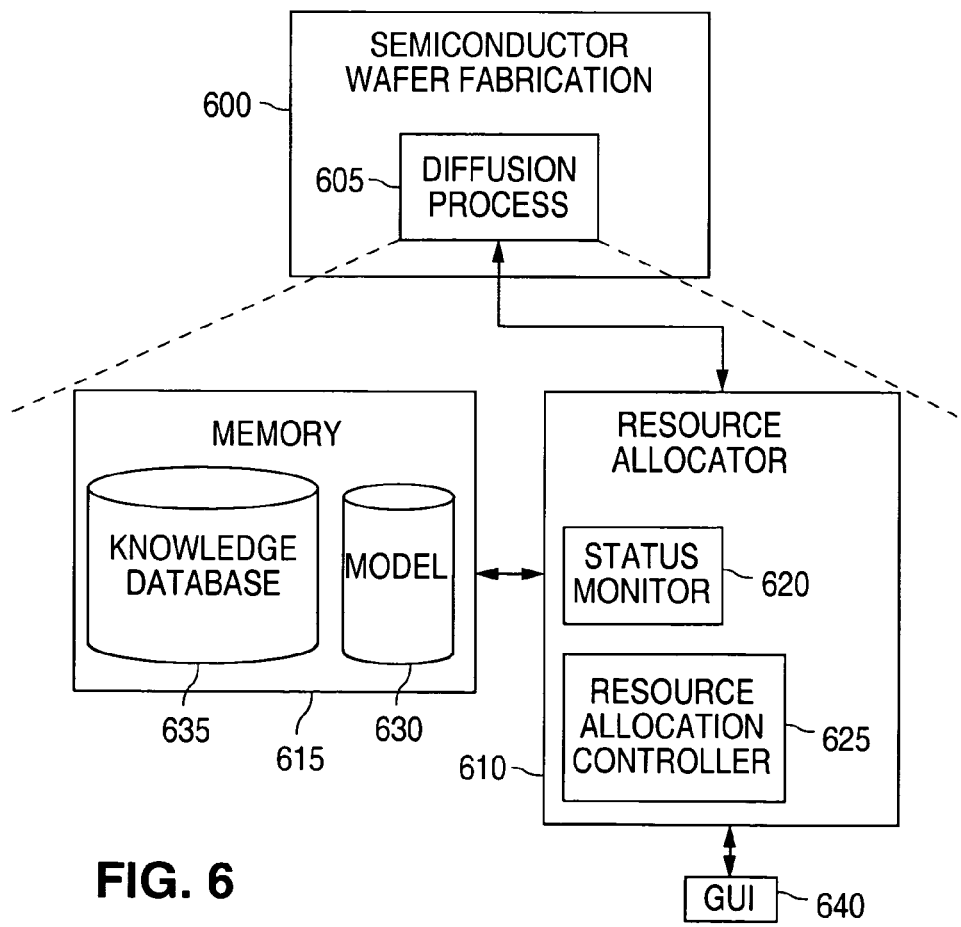
FIG. 6 illustrates a conceptual block diagram of an exemplary embodiment of a resource allocator for use in a diffusion process in semiconductor wafer fabrication according to one embodiment of the present invention.

Turning to FIG. 6, illustrated is a conceptual block diagram of an exemplary embodiment of a resource allocator 610 for use in a diffusion process 605 in semiconductor wafer fabrication 600. The diffusion processes in semiconductor wafer fabrication are well known and, for the purposes hereof, may again be described as a process of depositing a dopant material onto a silicone substrate and diffusing the dopant material into the silicone substrate via thermal agitation.

According to the illustrated embodiment, diffusion process 605 is operable to execute a plurality of diffusion process plans. Resource allocator 610 operates to allocate a plurality of multi-function resources or tools among a plurality of tasks of any given diffusion process plan. Resource allocator 610 comprises a monitoring controller 620, resource allocation controller 625, a model 630, and a graphical user interface 640.

Exemplary monitoring controller 620 monitors measurable characteristics associated with an executing diffusion process plan, the multi-function resources, and the related tasks. Each of the measurable characteristics is one of a status characteristic or a logistical characteristic. Exemplary model 630 is of diffusion process 605, and represents mathematically the plurality of multi-function resources and the plurality of tasks, as well as defines relationships among related ones thereof as a function of the diffusion process plans.

Exemplary resource allocation controller 625 operates the diffusion process model 630 in response to the monitored measurable characteristics and allocates certain of the multi-function resources among certain of the tasks to efficiently execute the diffusion process plan. Resource allocation controller 625 is therefore operable to select and reselect allocated ones of the multi-function resources among ones of the tasks in response to the monitored measurable characteristics.

During the diffusion process, meaning before, during and between execution of various diffusion process plans, resource allocation controller 625 operates to modify ones of the mathematical representations in response to the status or logistical characteristic data.

The illustrated resource allocator 610 also comprises a data repository, or memory 615, having at least a knowledge database 635. Resource allocator 610 further operates to modify knowledge database 635 in response to changes to or the condition/value of the status and logistical characteristic data to thereby enable the resource allocator to be self-learning.

In operation, resource allocator 610 allocates the multi-function resources among the tasks within diffusion process 605 that executes one or more diffusion process plans. Initially, and continuously, monitoring controller 620 monitors measurable characteristics that are associated with an at least one executing diffusion process plan, the multi-function resources, and the tasks. Each of the measurable characteristics is either status a characteristic or a logistical characteristic.

Model 630 of diffusion process 605 is instantiated to mathematically represent the of multi-function resources and tasks of diffusion process 605, and to define relationships among related ones thereof as a function of the at least one diffusion process plan.

Resource allocation controller 625 operates model 630 in response to the monitored measurable characteristics, and allocates ones of the multi-function resources among ones of the tasks within diffusion process 605 to efficiently execute at least one diffusion process plan.

Although the present invention has been described in detail, those skilled in the art should understand that they can make various changes, substitutions and alterations herein without departing from the spirit and scope of the invention in its broadest form.

What is claimed is:

1. A resource allocator operable to allocate a plurality of multi-function resources among a plurality of tasks within a process system, said process system capable of executing at least one application process, said resource allocator comprising:
   a monitoring controller that monitors measurable characteristics associated with said at least one application process, said plurality of multi-function resources, and said plurality of tasks, wherein each of said measurable characteristics comprises one of: a status characteristic and a logistical characteristic;
   a model of said process system representing mathematically said plurality of multi-function resources and said plurality of tasks, and defining relationships among related ones thereof as a function of said at least one application process; and
   a resource allocation controller that operates said model in response to ones of said monitored measurable characteristics and allocates ones of said plurality of multi-function resources among ones of said plurality of tasks within said process system to efficiently execute said at least one application process.

2. The resource allocator as set forth in claim 1 wherein said resource allocation controller is operable to modify one or more mathematical representations in the model.

3. The resource allocator as set forth in claim 1 further comprising a graphical user interface that is operable to enable supervisory interaction.

4. The resource allocator as set forth in claim 1 further comprising a data repository having at least a knowledge database, said resource allocator operable to modify said knowledge database in response to ones of said monitored measurable characteristics thereby enabling said resource allocator to be self-learning.

5. The resource allocator as set forth in claim 1 wherein said resource allocation controller is operable to reselect one of said allocated ones of said plurality of multi-function resources among ones of said plurality of tasks within said process system in response to said monitored measurable characteristics.

6. A method of operating a resource allocator to allocate a plurality of multi-function resources among a plurality of tasks within a process system, said process system capable of executing at least one application process, said method of operating said resource allocator comprising the steps of:
   monitoring measurable characteristics with a monitoring controller, said measurable characteristics associated with said at least one application process, said plurality of multi-function resources, and said plurality of tasks, wherein each of said measurable characteristics comprises one of: a status characteristic and a logistical characteristic;
   representing mathematically said plurality of multi-function resources and said plurality of tasks within a model of said process system, and defining relationships among related ones thereof as a function of said at least one application process; and
   operating said model in response to ones of said monitored measurable characteristics, and allocating ones of said plurality of multi-function resources among ones of said plurality of tasks within said process system using a resource allocation controller to efficiently execute said at least one application process.

7. The method of operating the resource allocator as set forth in claim 6 further comprising the step of providing a graphical user interface operable to enable supervisory interaction.

8. The method of operating the resource allocator as set forth in claim 6 further comprising the step of modifying one or more mathematical representations in the model.

9. The method of operating the resource allocator as set forth in claim 7 wherein the resource allocator further comprises a data repository having at least a knowledge database, and said method further comprises the step of modifying said knowledge database in response to ones of said monitored measurable characteristics thereby enabling said resource allocator to be self-learning.

10. The method of operating the resource allocator resource allocator as set forth in claim 7 further comprising the step of reselecting one of said allocated ones of said plurality of multi-function resources among ones of said plurality of tasks within said process system in response to said monitored measurable characteristics.

11. A process system capable of executing at least one application process, said process system comprising:
    a plurality of process subsystems;
    a plurality of tasks to be performed within said plurality of process subsystems;
    a plurality of multi-function resources; and a resource allocator that is operable to allocate said plurality of multi-function resources among said plurality of tasks, said resource allocator comprising:
  a monitoring controller that monitors measurable characteristics associated with said at least one application process, said plurality of multi-function resources, and said plurality of tasks, wherein each of said measurable characteristics comprises one of: a status characteristic and a logistical characteristic;
  a model of said process system representing mathematically said plurality of multi-function resources and said plurality of tasks, and defining relationships among related ones thereof as a function of said at least one application process; and
  a resource allocation controller that operates said model in response to ones of said monitored measurable characteristics, and allocates ones of said plurality of multi-function resources among ones of said plurality of tasks within said process system to efficiently execute said at least one application process.

12. The process system as set forth in claim 11 wherein said resource allocation controller is operable to modify one or more mathematical representations in the model.

13. The process system as set forth in claim 11 further comprising a graphical user interface that is operable to enable supervisory interaction.

14. The process system as set forth in claim 11 further comprising a data repository having at least a knowledge database, said resource allocator operable to modify said knowledge database in response to ones of said monitored measurable characteristics thereby enabling said resource allocator to be self-learning.

15. The process system as set forth in claim 11 wherein said resource allocation controller is operable to reselect one of said allocated ones of said plurality of multi-function resources among ones of said plurality of tasks within said process system in response to said monitored measurable characteristics.

16. The process system as set forth in claim 13 wherein said process system controls one of a manufacturing plant, a refinery, a hotel, a restaurant, a traffic control system, a transportation control system and an emergency services system.

17. The process system as set forth in claim 13 wherein said resource allocator is an information management system.

18. A resource allocator operable to allocate a plurality of multi-function resources among a plurality of tasks within a diffusion process, said diffusion process capable of executing at least one diffusion process plan, said resource allocator comprising:
  a monitoring controller that monitors measurable characteristics associated with said at least one diffusion process plan, said plurality of multi-function resources, and said plurality of tasks, wherein each of said measurable characteristics comprises one of: a status characteristic and a logistical characteristic;
  a model of said diffusion process representing mathematically said plurality of multi-function resources and said plurality of tasks, and defining relationships among related ones thereof as a function of said at least one diffusion process plan; and
  a resource allocation controller that operates said model in response to ones of said monitored measurable characteristics and allocates ones of said plurality of multi-function resources among ones of said plurality of tasks within said diffusion process to efficiently execute said at least one diffusion process plan.

19. The resource allocator as set forth in claim 18 wherein said resource allocation controller is operable to modify one or more mathematical representations in the model.

20. The resource allocator as set forth in claim 18 further comprising a graphical user interface that is operable to enable supervisory interaction.

21. The resource allocator as set forth in claim 18 further comprising a data repository having at least a knowledge database, said resource allocator operable to modify said knowledge database in response to ones of said monitored measurable characteristics thereby enabling said resource allocator to be self-learning.

22. The resource allocator as set forth in claim 18 wherein said resource allocation controller is operable to reselect one of said allocated ones of said plurality of multi-function resources among ones of said plurality of tasks within said diffusion process in response to said monitored measurable characteristics.

23. The resource allocator as set forth in claim 18 wherein each said status characteristic is one of execution data, timing data, alert data, completion data.

24. The resource allocator as set forth in claim 18 wherein each said logistical characteristic is one of assignment data, availability data, capacity data, diffusion process plan data, prioritization data.

25. A method of operating a resource allocator to allocate a plurality of multi-function resources among a plurality of tasks within a diffusion process, said diffusion process capable of executing at least one diffusion process plan, said method of operating said resource allocator comprising the steps of:
  monitoring measurable characteristics with a monitoring controller, said measurable characteristics associated with said at least one diffusion process plan, said plurality of multi-function resources, and said plurality of tasks, wherein each of said measurable characteristics comprises one of a status characteristic and a logistical characteristic;
  representing mathematically said plurality of multi-function resources and said plurality of tasks within a model of said diffusion process, and defining relationships among related ones thereof as a function of said at least one diffusion process plan; and
  operating said model in response to ones of said monitored measurable characteristics, and allocating ones of said plurality of multi-function resources among ones of said plurality of tasks within said diffusion process using a resource allocation controller to efficiently execute said at least one diffusion process plan.

26. The method of operating a resource allocator as set forth in claim 25 further comprising the step of modifying one or more mathematical representations in the model.

27. The method of operating a resource allocator as set forth in claim 25 wherein said resource allocator comprises a graphical user interface that is operable to enable supervisory interaction.

28. The method of operating a resource allocator as set forth in claim 25 wherein said resource allocator comprises a data repository having at least a knowledge database, said resource allocator operable to modify said knowledge database in response to ones of said monitored measurable characteristics thereby enabling said resource allocator to be self-learning.

29. The method of operating a resource allocator as set forth in claim 25 further comprising the step of reselecting resources among ones of said plurality of tasks within said one of said allocated ones of said plurality of multi-function diffusion process in response to said monitored measurable characteristics.

30. The method of operating a resource allocator as set forth in claim 25 wherein each said status characteristic is one of execution data, timing data, alert data, completion data.

31. The method of operating a resource allocator as set forth in claim 25 wherein each said logistical characteristic is one of assignment data, availability data, capacity data, diffusion process plan data, prioritization data.

* * * * *

UNITED STATES PATENT AND TRADEMARK OFFICE
CERTIFICATE OF CORRECTION

| | | |
|---|---|---|
| PATENT NO. | : 6,957,113 B1 | Page 1 of 1 |
| APPLICATION NO. | : 10/299949 | |
| DATED | : October 18, 2005 | |
| INVENTOR(S) | : George Logsdon and Gary Elmore | |

It is certified that error appears in the above-identified patent and that said Letters Patent is hereby corrected as shown below:

Column 11, line 51, delete "process stage";

Column 14, claim 10, line 56, delete "resource allocator";

Column 16, claim 29, delete claim 29 in its entirety and replace it with the following:

-- 29. The method of operating a resource allocator as set forth in Claim 25 further comprising the step of reselecting one of said allocated ones of said plurality of multi-function resources among ones of said plurality of tasks within said diffusion process in response to said monitored measurable characteristics. --

Signed and Sealed this

Fourteenth Day of November, 2006

JON W. DUDAS
*Director of the United States Patent and Trademark Office*